US012492989B2

(12) United States Patent
Akamatsu et al.

(10) Patent No.: US 12,492,989 B2
(45) Date of Patent: Dec. 9, 2025

(54) GAS ANALYZING DEVICE

(71) Applicant: HORIBA STEC, Co., Ltd., Kyoto (JP)

(72) Inventors: Takeshi Akamatsu, Kyoto (JP); Masato Nakayama, Kyoto (JP)

(73) Assignee: HORIBA STEC, CO., LTD., Kyoto (JP)

( * ) Notice: Subject to any disclaimer, the term of this patent is extended or adjusted under 35 U.S.C. 154(b) by 71 days.

(21) Appl. No.: 18/269,644

(22) PCT Filed: Dec. 21, 2021

(86) PCT No.: PCT/JP2021/047224
§ 371 (c)(1),
(2) Date: Jun. 26, 2023

(87) PCT Pub. No.: WO2022/190555
PCT Pub. Date: Sep. 15, 2022

(65) Prior Publication Data

US 2024/0060881 A1 Feb. 22, 2024

(30) Foreign Application Priority Data

Mar. 12, 2021 (JP) ................................ 2021-040603

(51) Int. Cl.
*G01N 21/3504* (2014.01)
*G01N 21/05* (2006.01)

(52) U.S. Cl.
CPC ......... *G01N 21/3504* (2013.01); *G01N 21/05* (2013.01)

(58) Field of Classification Search
CPC ........................... G01N 21/3504; G01N 21/05
See application file for complete search history.

(56) References Cited

U.S. PATENT DOCUMENTS

2010/0238446 A1 9/2010 Akiyama et al.
2012/0287418 A1 11/2012 Scherer et al.
(Continued)

FOREIGN PATENT DOCUMENTS

JP 61-50250 4/1986
JP 61-050250 A * 4/1986 ............ G01N 21/05
(Continued)

OTHER PUBLICATIONS

International Search Report issued in International Bureau of WIPO Patent Application No. PCT/JP2021/047224, dated Feb. 1, 2022.
(Continued)

*Primary Examiner* — Jamil Ahmed
(74) *Attorney, Agent, or Firm* — Greenblum & Bernstein, P.L.C.

(57) ABSTRACT

A gas analyzing device that irradiates a gas with a laser beam and detects the laser beam having penetrated the gas to analyze a component to be measured contained in the gas is configured so as to reduce a moment in a gravity direction generated about a fulcrum of an attachment location or the like is reduced to suppress optical deviation as much as possible. The gas analyzing device includes a gas cell attached to a piping through which the gas flows and into which the gas is introduced, and an elongated optical cell connected to the gas cell from a predetermined connection direction. The optical cell accommodates an optical system supported by a surface plate in a state of being disposed on an optical path of the laser beam. The optical cell stands up with respect to the connection direction.

10 Claims, 10 Drawing Sheets

(56) References Cited

U.S. PATENT DOCUMENTS

| | | | |
|---|---|---|---|
| 2013/0175450 | A1 | 7/2013 | Scherer et al. |
| 2014/0192343 | A1 | 7/2014 | Harrison et al. |
| 2015/0059440 | A1 | 3/2015 | Harrison et al. |
| 2016/0377531 | A1 | 12/2016 | Harrison et al. |
| 2016/0377581 | A1 | 12/2016 | Harrison et al. |
| 2017/0010207 | A1 | 1/2017 | Fetzner et al. |
| 2017/0030828 | A1 | 2/2017 | Harrison et al. |
| 2017/0030874 | A1 | 2/2017 | Harrison et al. |
| 2017/0248517 | A1 | 8/2017 | Scherer et al. |
| 2019/0086333 | A1 | 3/2019 | Scherer et al. |
| 2019/0293614 | A1 | 9/2019 | Harrison et al. |

FOREIGN PATENT DOCUMENTS

| | | | |
|---|---|---|---|
| JP | 2004053405 A * | 2/2004 | ............. G01N 21/35 |
| JP | 2007-101433 | 4/2007 | |
| JP | 2007101433 A * | 4/2007 | ............. G01N 21/35 |
| JP | 2010-217031 | 9/2010 | |
| JP | 2014-105991 | 6/2014 | |
| JP | 2014105991 A * | 6/2014 | ............. G01N 21/05 |
| JP | 2015-532433 | 11/2015 | |
| JP | 2017-504028 | 2/2017 | |
| JP | 2017-187468 | 10/2017 | |
| JP | 2018-84523 | 5/2018 | |
| TW | 201018900 | 5/2010 | |
| WO | 2014/062419 | 4/2014 | |

OTHER PUBLICATIONS

Taiwan, Office Action received in TW patent application No. 111103042, dated Jun. 9, 2025, and English language translation thereof.

* cited by examiner 5
2
10
5
2
7
2
7
1
H
10
7
2
100

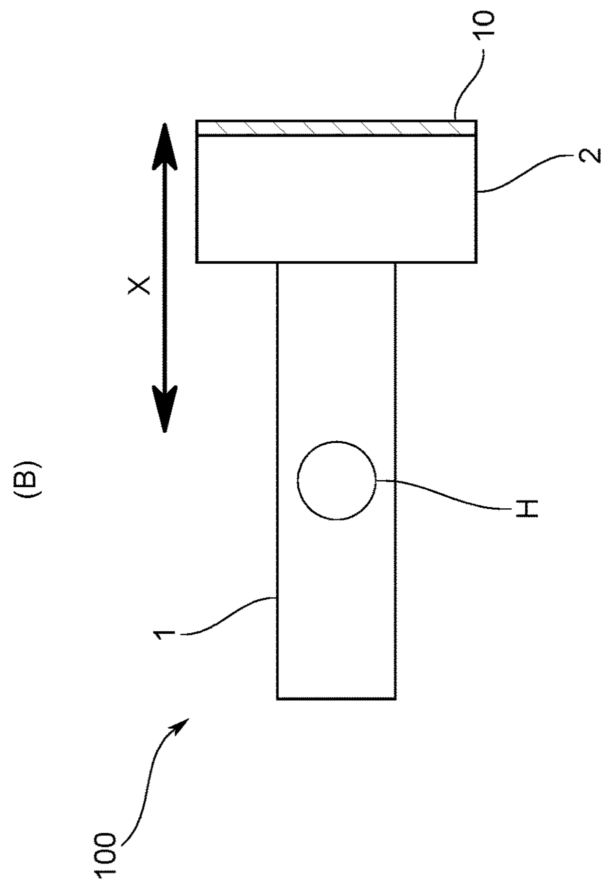
FIG.9
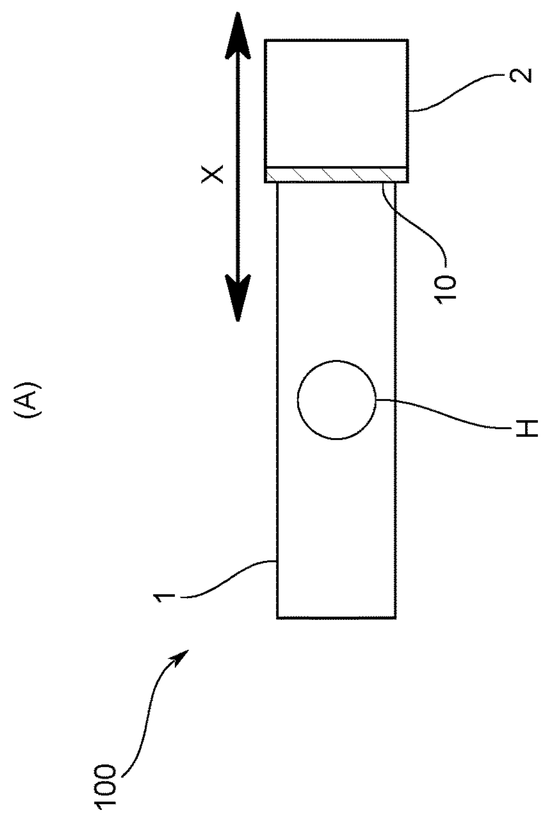

GAS ANALYZING DEVICE

TECHNICAL FIELD

The present invention relates to a gas analyzing device.

BACKGROUND ART

Conventional gas analyzing devices such as that disclosed in Patent Literature 1 include a known device which uses an infrared absorption method whereby a gas introduced into a gas cell is irradiated with a laser beam, and a component to be measured contained in the gas is analyzed by detecting the laser beam having penetrated the gas.

Such a gas analyzing device has been used for analysis of exhaust gas emitted from a vehicle, for example. In such an application, for example, due to installation and use in a predetermined location, a light source, a detector, an optical system, and the like are mounted on one surface plate, for example, and these elements are accommodated in a stationary optical cell as a device configuration.

Conversely, there is recent demand for applying the above-described gas analyzing device to analysis of a material gas or a by-product gas used in a semiconductor manufacturing process, for example. In such an application, for example, in order to grasp the state in a process chamber with as little time difference as possible, a gas cell may be attached to a piping connected to the process chamber and used. In such a case, since the piping layout varies depending on the site, the posture of the gas analyzing device after attachment also varies.

Then, as illustrated in FIG. 10, when the gas cell is attached to a piping extending vertically and the optical cell or the surface plate is connected to the gas cell in a tilted posture, a moment in the gravity direction occurs about a fulcrum of the attachment position of the gas cell generated by the weight of the optical cell, and the surface plate is bent by the moment, which causes a problem that the optical axis of the laser beam is shifted. Such optical axis deviation due to the moment is a problem that occurs not only when the gas cell is attached to the piping but also when, for example, the optical cell or the surface plate is attached to a predetermined position.

The problem described above is particularly remarkable when a multipass cell is used as the gas cell. This is because the incident angle of the laser beam incident on the gas cell of the multipass cell needs to be adjusted to ±0.1 degrees or less, and a slight optical axis deviation caused by bending of the surface plate causes a decrease in signal intensity, and analysis accuracy cannot be secured.

CITATION LIST

Patent Literature

Patent Literature 1: JP 2017-187468 A

SUMMARY OF THE INVENTION

Technical Problem

Therefore, the present invention has been made to solve the above problems, and a main object thereof is to reduce a moment in the gravity direction generated about the fulcrum of an attachment location or the like and to suppress optical axis deviation as much as possible.

Solution to Problem

That is, a gas analyzing device according to the present invention irradiates a gas with a laser beam and detects the laser beam having penetrated the gas to analyze a component to be measured contained in the gas. The gas analyzing device includes a gas cell attached to a piping through which the gas flows and into which the gas is introduced, and an elongated optical cell connected to the gas cell from a predetermined connection direction. The elongated optical cell accommodates an optical system supported by an elongated surface plate in a state of being disposed on an optical path of the laser beam. The optical cell and the surface plate are standing up with respect to the connection direction.

According to this gas analyzing device, the optical cell and the surface plate are stood up. Therefore, for example, in a case where the gas cell is attached to a piping extending vertically, the distance from the attachment location of the gas cell to the center of gravity of the optical cell is shortened as compared with the conventional configuration in which the optical cell and the surface plate are laid down, the moment in the gravity direction generated about the fulcrum of the attachment location can be reduced, and optical axis deviation can be suppressed as much as possible.

Moreover, since the optical cell is stood up which causes the optical system to be arranged such that the optical path becomes three-dimensional, space in the optical cell can be efficiently utilized, and miniaturization and weight reduction can be achieved.

The surface plate is preferably disposed to face the gas cell.

With such a configuration, since the surface plate can be brought closer to the gas cell side, the moment in the gravity direction can be further reduced as compared with the conventional configuration in which the surface plate is laid down.

Another gas analyzing device according to the present invention irradiates a gas with a laser beam and detects the laser beam having penetrated the gas to analyze a component to be measured contained in the gas. The gas analyzing device includes a gas cell attached to a piping through which the gas flows and into which the gas is introduced, and an elongated optical cell connected to the gas cell from a predetermined connection direction. The optical cell accommodates an optical system supported by a surface plate in a state of being disposed on an optical path of the laser beam. The surface plate is disposed to face the gas cell.

According to this gas analyzing device, the surface plate is disposed to face the gas cell. In other words, the surface plate is standing up with respect to the connection direction of the gas cell and the optical cell. Therefore, for example, in a case where the gas cell is attached to piping extending vertically, the distance from the attachment location of the gas cell to the center of gravity of the optical cell is shortened as compared with the conventional configuration in which the surface plate is laid down, the moment in the gravity direction generated about the fulcrum of the attachment location can be reduced, and optical axis deviation can be suppressed as much as possible.

As an embodiment in which the above effects are more remarkably manifested, an aspect can be mentioned in which a light source that emits the laser beam, a detector that detects the laser beam, the optical system on a light-projecting side that guides the laser beam emitted from the light source to the gas cell, and the optical system on a light-receiving side that guides the laser beam having penetrated the gas to the detector are supported by the surface plate.

According to such a configuration, since many components such as a light source, a detector, and various optical systems are supported by the surface plate, it is possible to more remarkably manifest the moment reduction effect obtained by arranging the surface plate on the gas cell side.

Many gas analyzing devices used in semiconductor manufacturing include elements such as a heating mechanism for heating a gas cell and a heat insulating material for covering the gas cell. In such a configuration, when the optical cell is positioned with respect to the gas cell, since the gas cell itself is covered with a heat insulating material or the like, it is conceivable to attach the optical cell to a peripheral member of the gas cell. However, since the peripheral structure of the gas cell is complicated, there is concern that positional deviation of the peripheral member will be accumulated to cause optical axis deviation in the above-described mounting aspect.

Therefore, in a configuration that includes a heating mechanism that heats the gas cell and a heat insulating material that covers the gas cell, it is preferable to further include a beam member with one end portion thereof connected to the optical cell and another end portion thereof positioned inside the heat insulating material and connected to the gas cell. The beam member connects the optical cell and the gas cell.

With such a configuration, since the optical cell and the gas cell are connected via the beam member, influence on the optical axis due to positional shift of the peripheral member of the gas cell can be reduced as much as possible while the temperature of the gas cell can be controlled.

Moreover, by interposing the beam member between the gas cell and the optical cell, the optical cell can be disposed at a distance from the gas cell, so that thermal influence from the gas cell to the optical cell can be reduced.

Furthermore, when the optical cell is attached to the beam member in a state of being positioned in advance, the beam member is positioned and attached to the gas cell, whereby the optical cell is positioned with respect to the gas cell. Accordingly, even when the beam member and the optical cell are removed from gas cell, adjustment of the optical system is unnecessary, and maintainability can be improved.

In order to prevent a decrease in heat insulation performance due to the beam member, it is preferable that the beam member have a heat insulation property higher than at least the surface plate.

It is preferable to include at least two reflecting mirrors that reflect the laser beam as the optical system on the light-projecting side that guides the laser beam to the gas cell.

In this case, since the optical axis of the laser beam can be accurately adjusted in an appropriate direction, the incident angle of the laser beam with respect to the gas cell can be set with high accuracy, and the moment reduction effect obtained by disposing the surface plate on the gas cell side can be remarkably manifested by supporting the plurality of reflecting mirrors on the surface plate.

In a configuration that includes an adjustment mechanism for adjusting a position or a posture of the optical system, it is preferable that an operation section for operating the adjustment mechanism face a side opposite to a central portion of the optical cell.

According to such a configuration, it is not only possible to adjust the optical axis of the laser beam after the assembly of the device, but operability at the time of adjustment is good since the operation section faces the outside of the optical cell.

If the gas cell is provided with a pair of internal reflecting mirrors to multiply reflect the laser beam, the moment reduction effect according to the present invention can be more remarkably manifested.

As a more specific embodiment, an aspect can be mentioned in which the gas cell is provided in a piping connected to a chamber in which a semiconductor manufacturing process is performed.

In order to reduce the weight of the optical cell, it is preferable to further include a second optical cell connected to the gas cell from a predetermined connection direction separately from the optical cell. The second optical cell accommodates an optical system supported on a surface plate in a state of being disposed on an optical path of the laser beam. The surface plate of the second optical cell is disposed to face the gas cell.

According to such a configuration, since various optical systems can be shared and accommodated in both the optical cell and the second optical cell, the weight of each optical cell can be reduced.

Moreover, since the surface plate of the second optical cell is also disposed to face the gas cell, for example, the distance from the attachment location of the gas cell to the center of gravity of the second optical cell is shortened, and the moment in the gravity direction generated about the fulcrum of this attachment location can be reduced.

Advantageous Effects of Invention

According to the present invention as described above, it is possible to reduce the moment in the gravity direction generated about the fulcrum of an attachment location or the like and to suppress optical axis deviation as much as possible.

BRIEF DESCRIPTION OF THE DRAWINGS

FIG. 9 is a schematic diagram illustrating a configuration of the gas analyzing device of another embodiment.

REFERENCE SIGNS LIST

Figure 1:
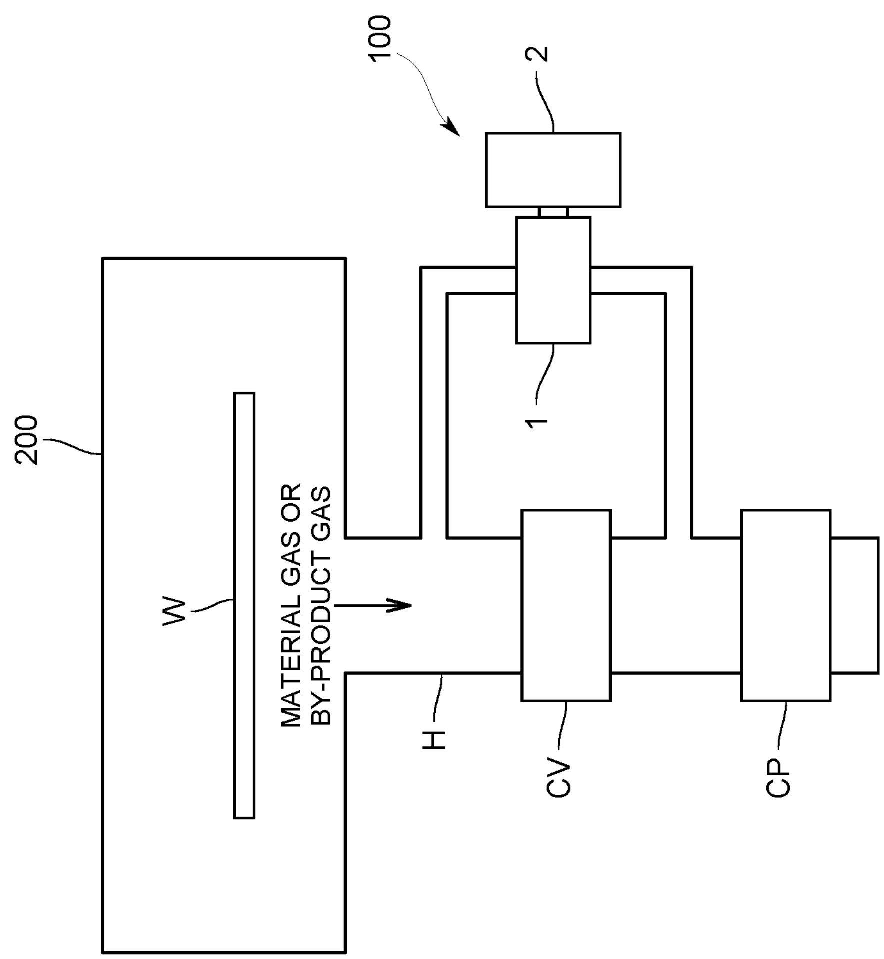
FIG. 1 is a schematic diagram illustrating a semiconductor manufacturing apparatus incorporating a gas analyzing device according to an embodiment of the present invention.

100 gas analyzing device
200 chamber
H piping
1 gas cell
2 optical cell
3 heating mechanism
4 heat insulating material
5 laser light source
6 optical system
7 photodetector
8 signal processing section
9 casing
10 surface plate
11 beam member
F1 flange portion
F2 flange portion
X connection direction
Y piping axial direction
M longitudinal direction
N short direction

DESCRIPTION OF EMBODIMENTS

The following describes a gas analyzing device according to an embodiment of the present invention with reference to the accompanying drawings.

Device Configuration

As illustrated in FIG. 1, for example, a gas analyzing device 100 of the present embodiment is used by being incorporated into a semiconductor manufacturing apparatus, and measures the concentration or partial pressure of a halide which is a component to be measured contained in a material gas used in a semiconductor manufacturing process or a by-product gas generated by the semiconductor manufacturing process (hereinafter, these are simply referred to as "gases"), for example. Here, examples of the halide include a fluoride, a chloride, and a bromide. However, the gas analyzing device 100 may measure components other than halides, and does not necessarily need to be incorporated into a semiconductor manufacturing apparatus.

The gas analyzing device 100 irradiates a gas with a laser beam and detects the laser beam having penetrated the gas to analyze a component to be measured contained in the gas through an infrared absorption method. Specifically, as illustrated in FIG. 1, the gas analyzing device 100 includes a gas cell 1 into which the gas is introduced, and an optical cell 2 accommodating various optical systems disposed on an optical path of the laser beam.

The gas cell 1 of the present embodiment guides a gas introduced into a chamber 200 in which a semiconductor manufacturing process is performed or a gas led out from the chamber 200, and is attached to a piping H connected to an exhaust port of the chamber 200 as illustrated in FIG. 1. The piping H is provided with a pressure control valve CV for controlling the pressure of the chamber 200 and a vacuum pump CP for vacuum drawing the chamber 200 in this order. The gas cell 1 is provided farther to the chamber 200 side than the vacuum pump CP, an inlet port of the gas cell 1 is connected to the upstream side of the pressure control valve CV, and an outlet port of the gas cell 1 is connected to the downstream side of the pressure control valve CV. As a result, the pressure of the gas cell 1 is reduced to a predetermined pressure smaller than atmospheric pressure. However, the arrangement of the gas cell 1 is not limited thereto, and for example, the inlet port may be connected to the downstream side of the pressure control valve CV.

Figure 2:
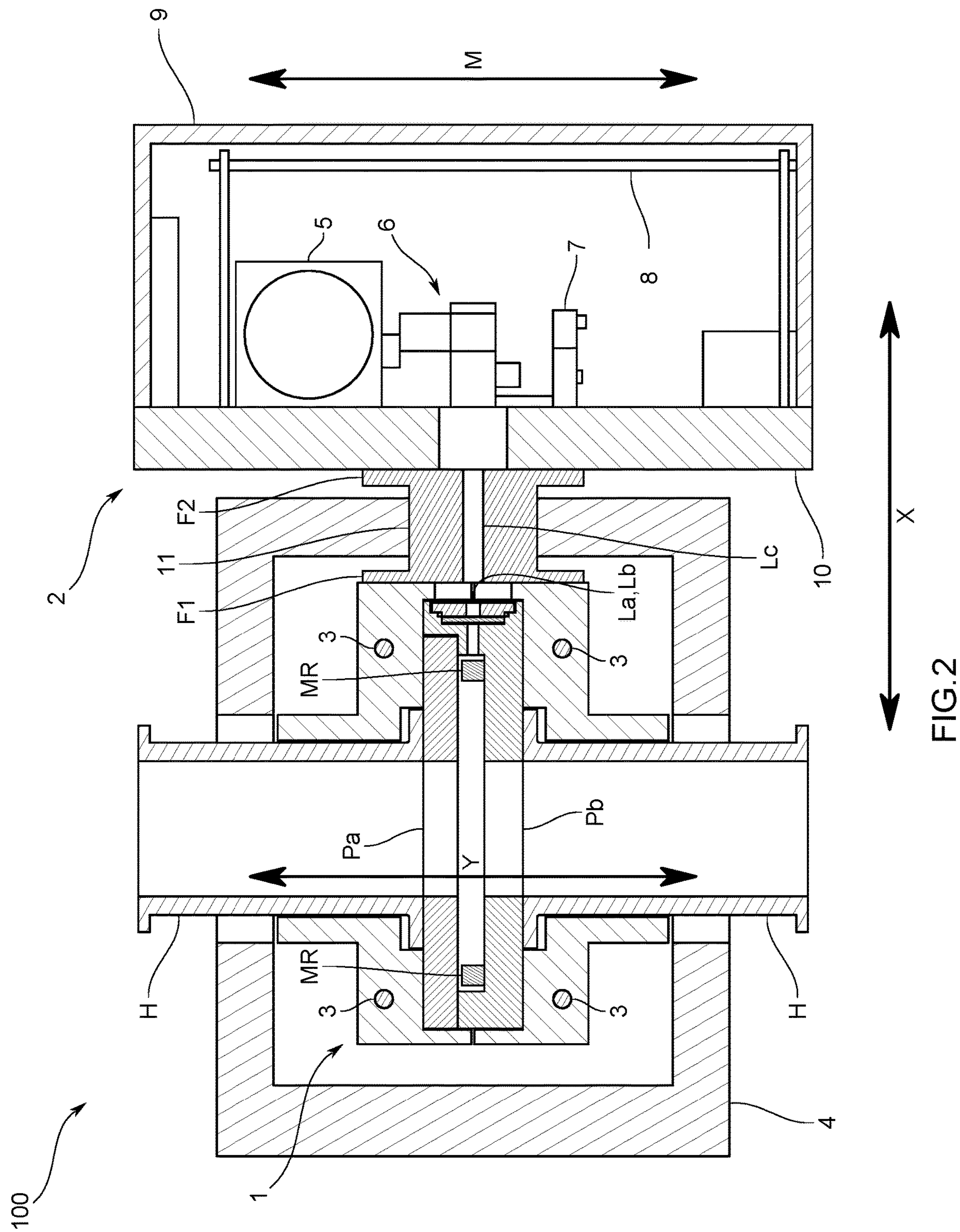
FIG. 2 is a schematic diagram illustrating an internal configuration of the gas analyzing device of the embodiment.

Specifically, as illustrated in FIG. 2, the gas cell 1 is formed with an incidence port La and an emission port Lb for the laser beam, and is provided with an inlet port Pa for introducing the gas therein and an outlet port Pb for discharging the gas therein. In addition, the gas cell 1 is a multipass cell in which a pair of reflecting mirrors MR is provided and which reflects the laser beam multiple times. Specifically, in the gas cell 1, the laser beam incident from the side of one reflecting mirror MR is reflected multiple times and then similarly emitted from the side of the one reflecting mirror MR. In other words, the incidence port La and the emission port Lb of the laser beam are provided on the same side.

In addition, a heating mechanism 3 such as a heater using, for example, an electric heating wire for heating the inside of the gas cell 1 to a predetermined temperature (e.g., 200° C.) is provided around the gas cell 1, and a heat insulating material 4 made of, for example, resin is further provided around the heating mechanism 3 so as to surround the gas cell 1.

Figure 3:
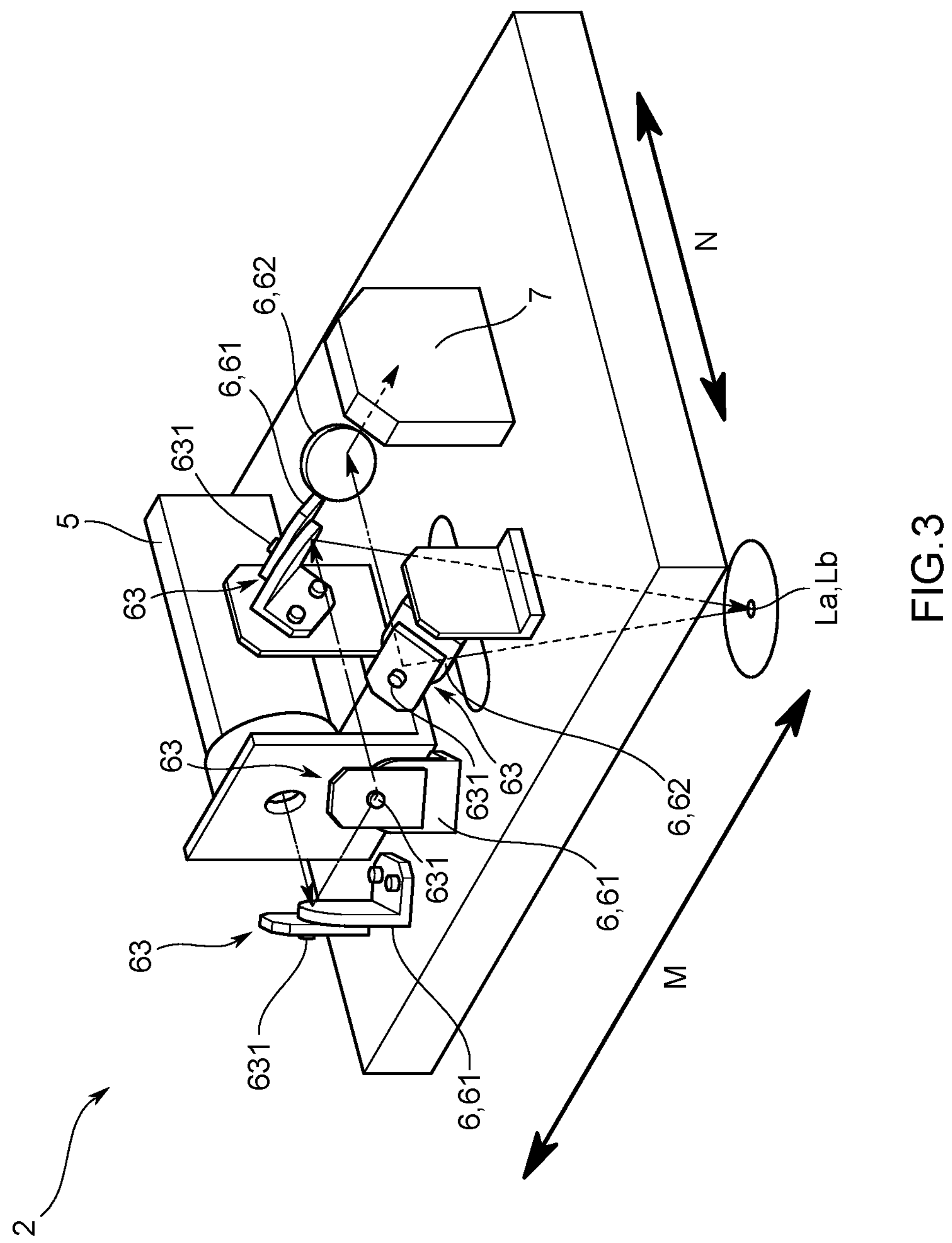
FIG. 3 is a schematic diagram illustrating an internal configuration of an optical cell in the gas analyzing device of the embodiment.

As illustrated in FIGS. 2 and 3, the optical cell 2 includes a light source 5 that irradiates the gas cell 1 with the laser beam, an optical system 6 provided on the optical path of the laser beam, a photodetector 7 that detects the laser beam having penetrated the gas, a signal processing section 8 that calculates a concentration or a partial pressure of a component to be measured using a light absorption signal obtained from an output signal of the photodetector 7, and a casing 9 that accommodates the light source 5, the optical system 6, the photodetector 7, and the signal processing section 8. In FIG. 3, in order to describe the internal structure of the optical cell 2, description of elements such as the casing 9 is omitted, and description is given in a different direction from FIG. 2.

The light source 5 is a laser tube that emits a wavelength-modulated laser beam, and oscillates, for example, a mid-infrared (2.5 to 25 μm) laser beam. The light source 5 can modulate the oscillation wavelength in a predetermined wavelength modulation range through an applied current (or voltage). As long as the oscillation wavelength is variable, another type of light source may be used, and the temperature may be changed in order to change the oscillation wavelength. In addition, the light source 5 may be a quantum cascade laser (QCL), which is a type of semiconductor laser, or may emit a laser beam having a specific wavelength without being limited to emitting a wavelength-modulated laser beam. Furthermore, a light source that emits light of various wavelengths such as a light source that emits infrared light or a light source that emits ultraviolet light may be used as the light source 5. Specifically, the light source is not limited to a laser light source that emits a laser beam, and various types of light sources may be used as long as the light source emits light, such as a thermal light source, an LED light source, a deuterium lamp, and a xenon lamp. When the multipass cell described above is used as the gas cell, a light source that emits a laser beam having high intensity and hardly attenuates even if the laser beam is reflected many times is suitable as the light source 5.

The optical system 6 is divided into an optical system 6 on a light-projecting side (hereinafter, also referred to as a light-projecting side optical system 61) that guides the laser beam emitted from the light source 5 to the gas cell 1 and an optical system 6 on a light-receiving side (hereinafter, also referred to as a light-receiving side optical system 62) that guides the laser beam having passed through the gas cell 1 to the photodetector 7. At least two reflecting mirrors that reflect the laser beam are provided as the light-projecting side optical system 61, and at least two reflecting mirrors that reflect the laser beam are provided as the light-receiving side optical system 62. Here, three reflecting mirrors are provided as the light-projecting side optical system 61 and two reflecting mirrors are provided as the light-receiving side optical system 62. Specifically, these are plane mirrors, concave mirrors, or the like.

In addition, the optical cell 2 of the present embodiment includes an adjustment mechanism 63 for adjusting the position or posture of the reflecting mirrors as the optical system 6 described above. Here, the adjustment mechanism 63 and the reflecting mirrors are provided in one-to-one correspondence, and an operation section 631 for a user to operate the adjustment mechanism 63 is disposed so as to face the side opposite to the central portion of the optical cell 2, that is, so as to face outward with the back toward the central portion.

Here, a thermal-type photodetector such as a relatively inexpensive thermopile is used as the photodetector 7, but another type of photodetector may be used. Examples thereof include a quantum photoelectric element having good responsiveness such as HgCdTe, InGaAs, InAsSb, or PbSe.

The signal processing section 8 includes an analog electric circuit with elements such as a buffer and an amplifier, a digital electric circuit with elements such as a CPU and memory, and components such as an AD converter and a DA converter that mediate between the analog and digital electric circuits. By cooperating with the CPU and peripheral devices thereof according to a predetermined program stored in a predetermined area of the memory, the signal processing section 8 manifests a function as a light source controller that controls the output of the light source 5, and a function as an arithmetic section that receives an output signal from the photodetector 7 and performs arithmetic processing on the value to calculate the concentration or the partial pressure of the component to be measured.

The casing 9 accommodates the various components described above, and has an elongated shape. This is because, for example, one or a plurality of components such as a circuit board constituting the signal processing section 8 have an elongated shape, and thus the optical cell 2 also has an elongated shape. The casing 9 of the present embodiment has a substantially rectangular parallelepiped shape, and one wall surface along the longitudinal direction thereof has a larger thickness dimension than the other wall surfaces and functions as a surface plate 10 that supports various components.

The surface plate 10 supports at least the optical system 6 in a state of being arranged on the optical path of the laser beam, and has a long flat plate shape extending in the longitudinal direction of the optical cell 2. The surface plate 10 of the present embodiment supports each of the light-projecting side optical system 61 and the light-receiving side optical system 62 described above, and also supports the light source 5 and the photodetector 7, and supports most of the total weight of the optical cell 2.

Figure 4:
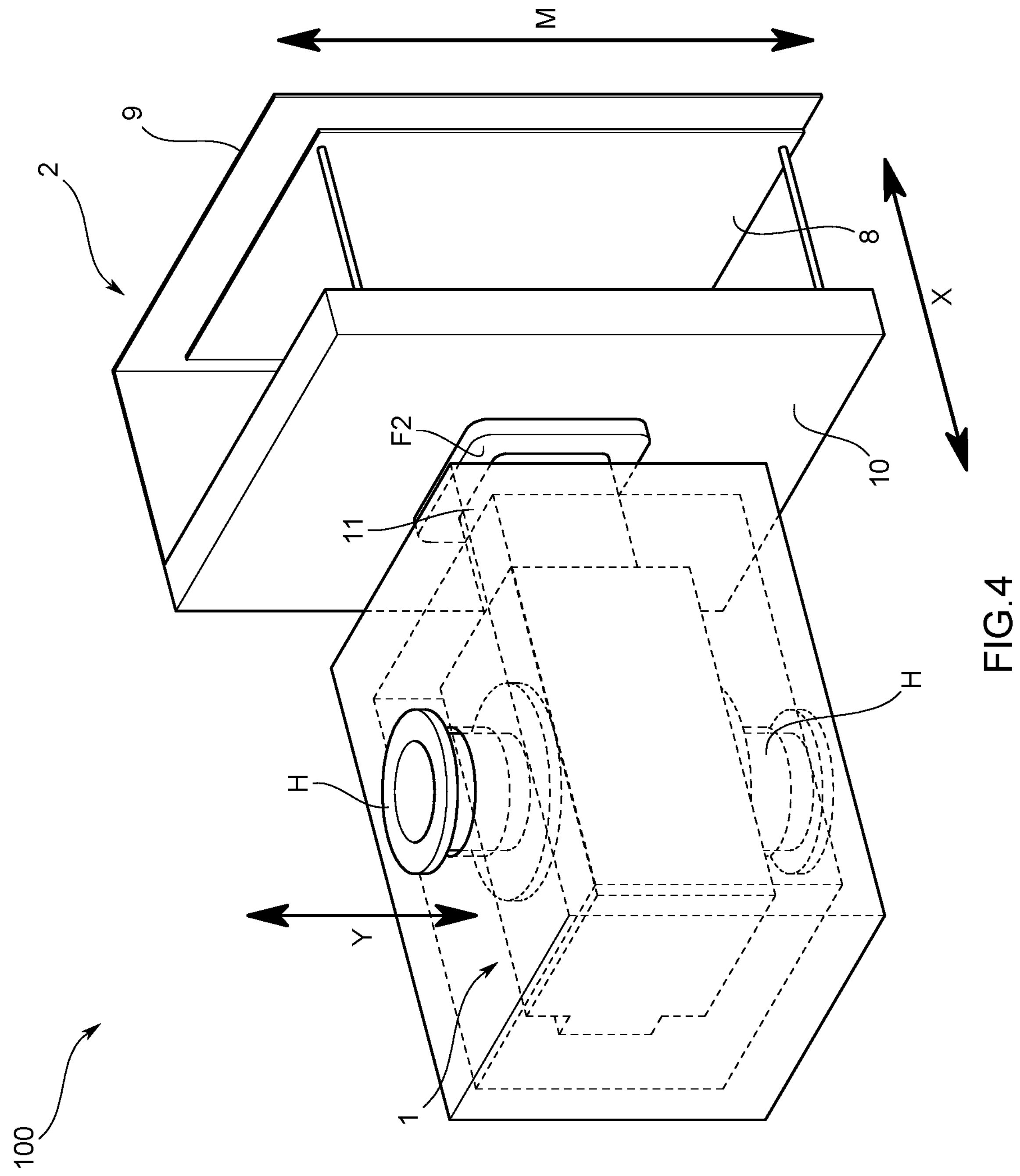
FIG. 4 is a schematic diagram illustrating an overall configuration of the gas analyzing device of the embodiment.

As illustrated in FIGS. 2 and 4, the optical cell 2 configured as described above is connected to the gas cell 1 from a predetermined connection direction X. More specifically, the connection direction X between the optical cell 2 and the gas cell 1 is a direction intersecting a flow direction Y of the gas introduced into the gas cell 1, that is, a piping axial direction Y of the piping H to which the gas cell 1 is connected, and is set here to a direction orthogonal to the flow direction Y of the gas and the piping axial direction Y of the piping H. That is, the optical cell 2 of the present embodiment is connected from the horizontal direction to the gas cell 1 attached to the piping H extending in the vertical direction.

Thus, in the present embodiment, the optical cell 2 is standing up with respect to the connection direction X with the gas cell 1. The state of standing up with respect to the connection direction X is a concept including not only an upright state of being upright (orthogonal) with respect to the connection direction X but also a state of being slightly inclined from the upright state.

More specifically, the optical cell 2 is connected to the gas cell 1 in a posture in which the longitudinal direction M intersects the connection direction X. Here, the longitudinal direction M and the connection direction X are orthogonal to each other. In addition, in this embodiment, as illustrated in FIG. 3, the laser tube as the above-described light source 5 is arranged in a short direction N, which is a direction in which the piping axis is orthogonal to the longitudinal direction M of the optical cell 2. In other words, the emission direction of the laser beam immediately after being emitted from the light source 5 is the short direction N of the optical cell 2. As the light source 5, various types of light source may be used as described above, and thus the emission direction from the light source 5 is not limited to the short direction N of the optical cell 2.

In such a configuration, the surface plate 10 described above is disposed facing the gas cell 1. That is, the surface plate 10 is disposed closer to the gas cell 1 than the central portion of the entire optical cell 2. In this embodiment, the surface plate 10 is directly or indirectly connected to the gas cell 1.

More specifically, in the present embodiment, as illustrated in FIGS. 2 and 4, a beam member 11 connecting the gas cell 1 and the optical cell 2 is interposed between the gas cell 1 and the optical cell 2, more specifically, between the gas cell 1 and the surface plate 10.

The beam member 11 has one end thereof connected to the optical cell 2 and the other end thereof positioned inside the heat insulating material 4 and connected to the gas cell 1. More specifically, a flange portion F2 on the optical cell 2 side, which is the one end, is screwed to the surface plate 10, for example, and a flange portion F1 on the gas cell 1 side, which is the other end, is screwed to the wall surface of the gas cell 1, for example. A light passage aperture Lc through which the laser beam passes is formed inside the beam member 11. In addition, the beam member 11 has a higher heat insulating property than at least the surface plate 10, is made of the same type or a different type of resin as the heat insulating material 4 described above, and is provided to penetrate the heat insulating material 4 so that the other end portion thereof is positioned inside the heat insulating material 4 described above.

Effects of Present Embodiment

According to the gas analyzing device 100 of the present embodiment configured as described above, the optical cell 2 is stood up with respect to the connection direction X, and the surface plate 10 that accounts for most of the total weight of the optical cell 2 is disposed on the gas cell 1 side. Therefore, for example, in a case where the gas cell 1 is attached to the piping H extending vertically, the distance from the attachment location of the gas cell 1 to the center of gravity of the optical cell 2 is shortened as compared with the conventional configuration in which the optical cell 2 is laid down, the moment in the gravity direction generated about the fulcrum of the attachment location can be reduced, and optical axis deviation can be suppressed as much as possible.

In particular, the gas cell 1 of the present embodiment is a multipass cell, the incident angle of the laser beam incident on the gas cell 1 needs to be adjusted to ±0.1 degrees or less, and optical axis deviation of several microns caused by bending of the surface plate 10 causes a signal error, so that the above-described moment reduction effect is more remarkably manifested.

Moreover, since the optical system 6 is arranged such that the optical path becomes three-dimensional by standing up the optical cell 2, space in the optical cell 2 can be efficiently utilized, and miniaturization and weight reduction can be achieved.

Furthermore, since at least two reflecting mirrors are provided as the light-projecting side optical system 61, the optical axis of the laser beam can be accurately adjusted in an appropriate direction, so that the incident angle of the laser beam with respect to the gas cell 1 can be set with high accuracy.

In addition, since the laser tube as the light source 5 is arranged such that the tube axis thereof is along the short direction N of the optical cell 2, the longitudinal direction M of the optical cell 2 can be made compact as compared with a case where the laser tube is arranged such that the tube axis is along the longitudinal direction M of the optical cell 2.

Furthermore, since the adjustment mechanism 63 that adjusts the position or posture of the optical system 6 is provided, it is not only possible to adjust the optical axis of the laser beam after the assembly of the device, but operability at the time of adjustment is good since the operation section 631 faces the outside of the optical cell 2.

In addition, since the heating mechanism 3 that heats the gas cell 1 and the heat insulating material 4 that surrounds the gas cell 1 are provided, the temperature of the gas cell 1 can be adjusted, and for example, deterioration or the like of the gas to be measured can be prevented.

Furthermore, in the configuration including the heating mechanism 3 and the heat insulating material 4 as described above, if the optical cell is attached to a peripheral member (e.g., the heat insulating material 4) of the gas cell, since the peripheral structure of the gas cell 1 is complicated, there is concern that positional deviation of the peripheral member will be accumulated to cause optical axis deviation. However, in the present embodiment, since the gas cell 1 and the optical cell 2 are connected via the beam member 11, influence on the optical axis due to positional deviation of the peripheral member of the gas cell 1 can be reduced as much as possible while the gas cell 1 can be temperature-controlled.

Moreover, by interposing the beam member 11 between the gas cell 1 and the optical cell 2, the optical cell 2 can be disposed at a distance from the gas cell 1, so that thermal influence from the gas cell 1 to the optical cell 2 can be reduced.

Furthermore, when the optical cell 2 is attached to the beam member 11 in a state of being positioned in advance, the beam member 11 is positioned and attached to the gas cell 1, whereby the optical cell 2 is positioned with respect to the gas cell 1. Accordingly, even when the beam member 11 and the optical cell 2 are removed from the gas cell 1, adjustment of the optical system 6 is unnecessary, and maintainability can be improved.

In addition, since the beam member 11 has heat insulating properties equivalent to those of the heat insulating material 4, it is possible to more reliably reduce thermal influence from the gas cell 1 to the optical cell 2 described above, and it is also possible to prevent deterioration in heat insulating properties due to the beam member 11.

Furthermore, as the cross-sectional area of the beam member 11 is increased, the cross-sectional secondary moment is increased, bending of the beam member 11 can be reduced, and optical axis deviation can be further reduced.

Other Embodiments

Figure 5:
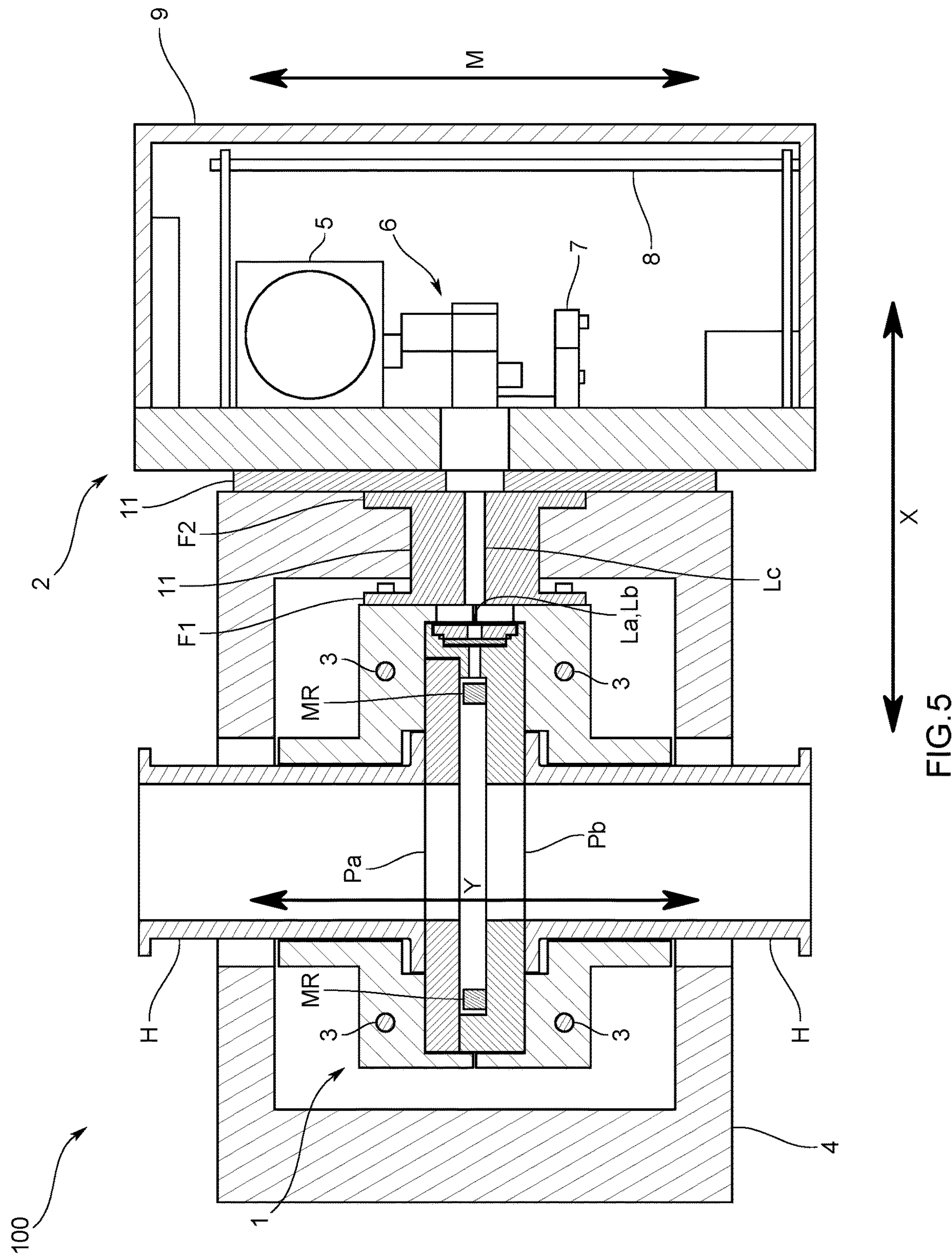
FIG. 5 is a schematic diagram illustrating an internal configuration of the gas analyzing device of another embodiment.

For example, although the gas cell 1 and the optical cell 2 are connected by a single beam member 11 in the above embodiment, the gas cell 1 and the optical cell 2 may be connected by two or more beam members 11 as illustrated in FIG. 5.

By providing a plurality of beam members 11 in this manner, the heat insulating material 4 can be thickened, and the temperature control function can be further secured.

Figure 6:
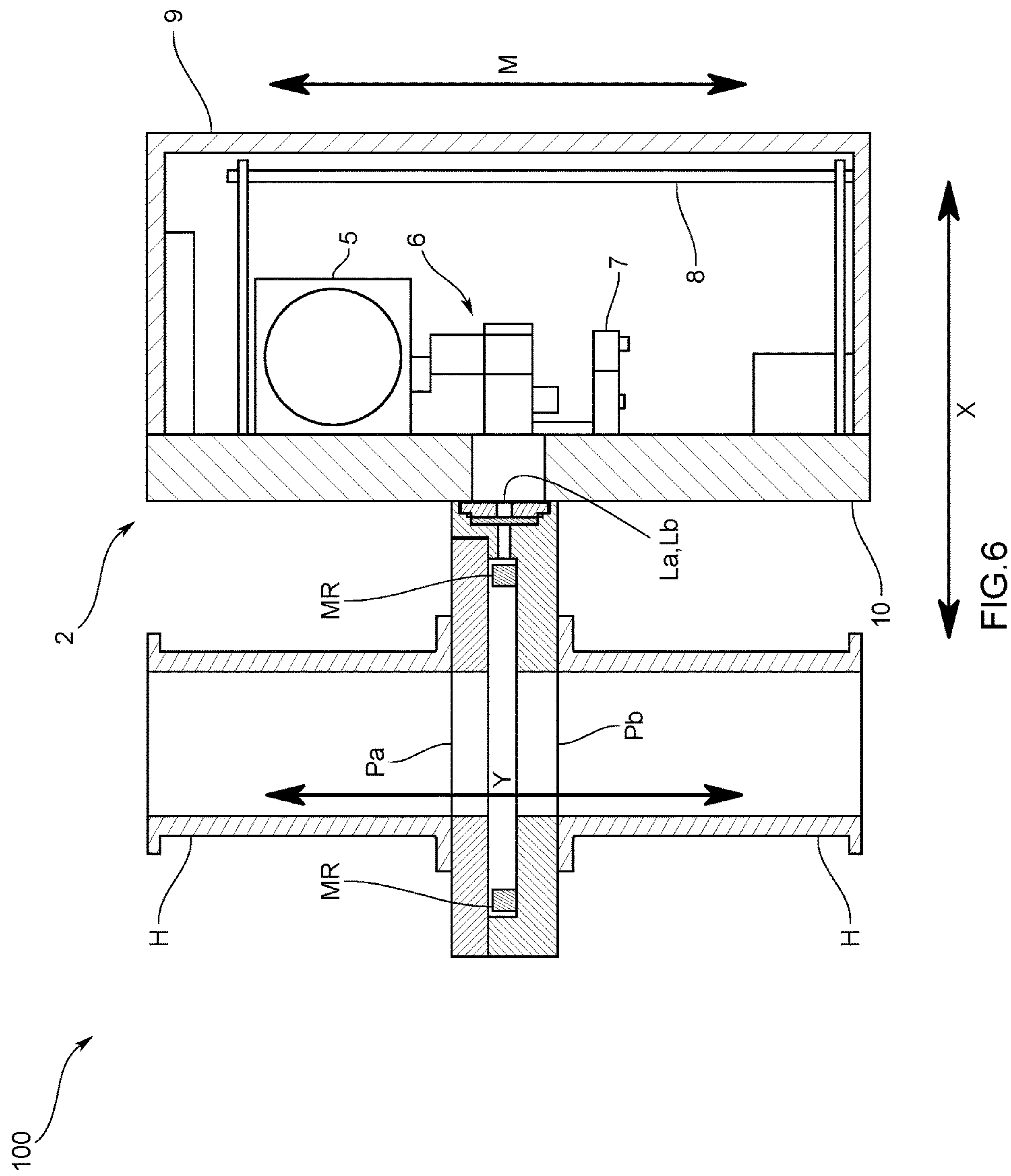
FIG. 6 is a schematic diagram illustrating an internal configuration of the gas analyzing device of another embodiment.

As illustrated in FIG. 6, the gas analyzing device 100 according to the present invention does not necessarily include a temperature adjustment mechanism of the gas cell 1. In this case, the heating mechanism 3 and the heat insulating material 4 in the above embodiment can be made unnecessary. In this case, the gas cell 1 and the optical cell 2 may be directly connected to each other with no beam member 11 or the like interposed therebetween.

Figure 7:
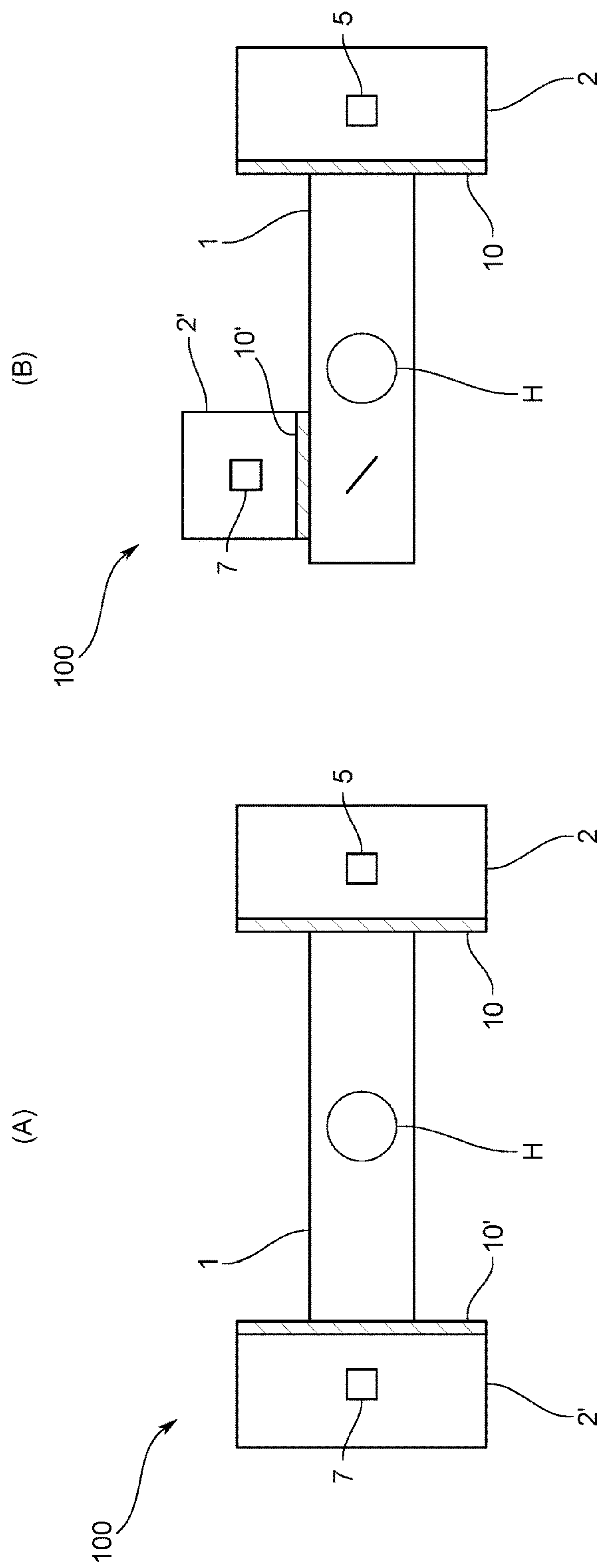
FIG. 7 is a schematic diagram illustrating an arrangement of a second optical cell in the gas analyzing device of another embodiment.

Further, in the above embodiment, an aspect has been described in which a single optical cell 2 is connected to the gas cell 1. However, as illustrated in FIG. 7, one or a plurality of second optical cells 2' may be connected to the gas cell 1.

In other words, the gas analyzing device 100 according to the present invention may further include, separately from the optical cell 2, a second optical cell 2' connected to the gas cell 1 from a predetermined connection direction and accommodating an optical system supported on the surface plate in a state of being arranged on the optical path of the laser beam.

According to such a configuration, since various optical systems can be shared and accommodated in both the optical cell and the second optical cell, the weight of each optical cell can be reduced.

Specifically, for example, an aspect can be mentioned in which one of the optical cell 2 and the second optical cell 2' accommodates the light source 5 and the light-projecting side optical system, and the other accommodates the photodetector 7 and the light-receiving side optical system.

In this case, as illustrated in FIG. 7(A), the optical cell 2 and the second optical cell 2' may be arranged to face each other so as to sandwich the gas cell 1. Alternatively, as illustrated in FIG. 7(B), the optical cell 2 and the second optical cell 2' may be arranged so that the connection direction of the optical cell 2 and the gas cell 1 and the connection direction of the second optical cell 2' and the gas cell 1 intersect each other.

In such a configuration, it is preferable that the surface plate of the second optical cell 2' be disposed to face the gas cell 1. With this arrangement, the distance from the attachment location of the gas cell 1 to the center of gravity of the second optical cell 2' is shortened, and the moment in the gravity direction generated about the fulcrum of this attachment location can be reduced.

A specific shape of the second optical cell 2' may be an elongated shape such as a substantially rectangular parallelepiped shape, or may be a substantially cubic shape. When the second optical cell 2' has an elongated shape, the second optical cell 2' is also preferably standing up with respect to the connection direction of the gas cell 1.

Figure 8:
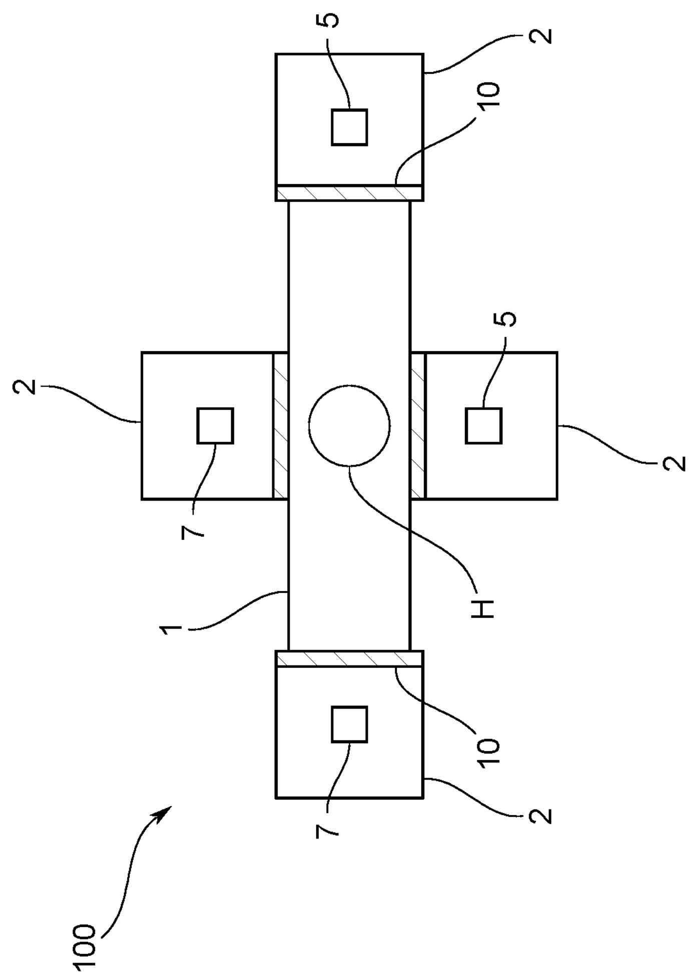
FIG. 8 is a schematic diagram illustrating a configuration of the gas analyzing device of another embodiment.
Figure 10:
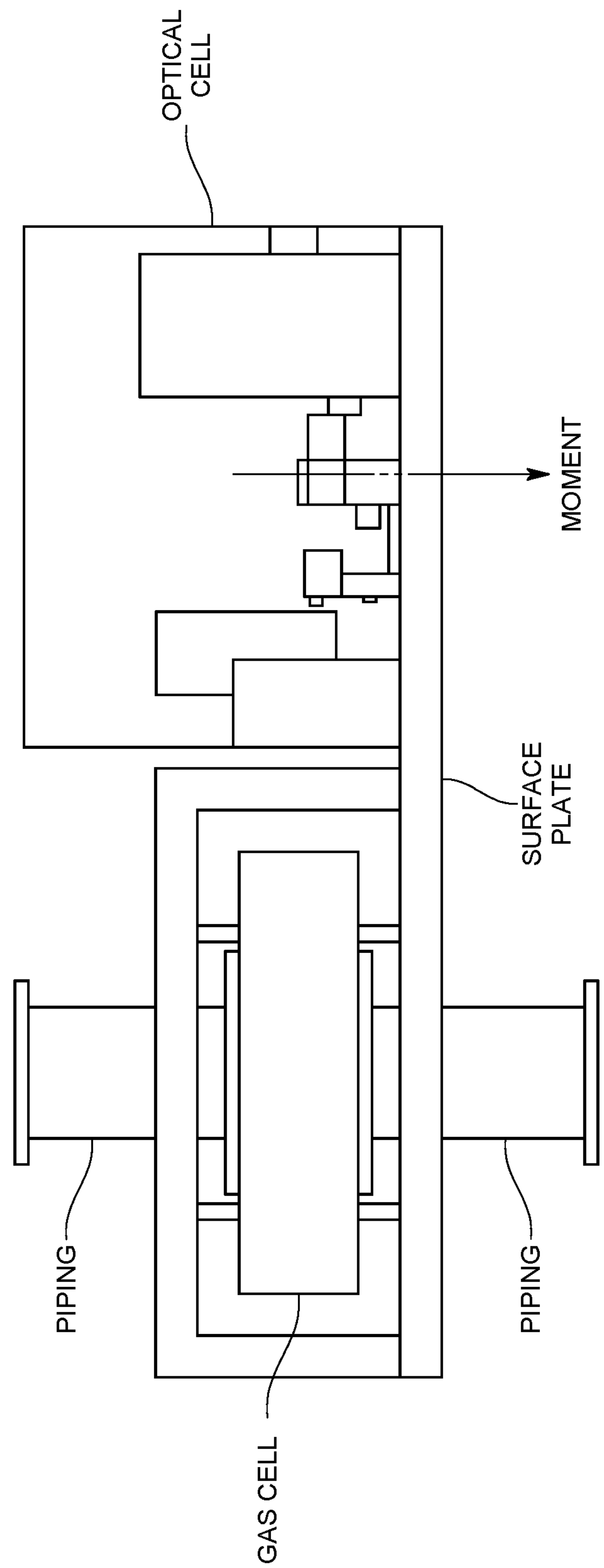
FIG. 10 is a schematic diagram illustrating a configuration of a conventional gas analyzing device.

Furthermore, as illustrated in FIG. 8, the gas analyzing device 100 according to the present invention may be provided with a plurality of optical paths of the laser beam that penetrates the gas and is guided to the photodetector 7 by using a plurality of light sources 5 or branching a single light source 5 with an unillustrated beam splitter.

In this case, for example, one optical path may be multiply reflected as in the above-described embodiment to be a long optical path, and the other optical path may be, for example, a short optical path shorter than the one optical path without being multiply reflected.

In addition, in the gas analyzing device 100 according to the present invention, as shown in FIG. 9(A), as long as the surface plate 10 constituting the optical cell 2 is disposed to face the gas cell 1, the optical cell 2 does not need to be elongated and may have a substantially cubic shape, for example.

According to this configuration, the surface plate 10 is disposed to face the gas cell 1. In other words, the surface plate 10 is standing up with respect to the connection direction X of the gas cell 1 and the optical cell 2. Therefore, for example, in a case where the gas cell is attached to the piping H extending vertically, the distance from the attachment location of the gas cell 1 and the like to the center of gravity of the optical cell 2 is shortened as compared with the conventional configuration in which the surface plate 10 is laid down, the moment in the gravity direction generated about the fulcrum of the attachment location can be reduced, and optical axis deviation can be suppressed as much as possible.

In addition, in the gas analyzing device 100 according to the present invention, as shown in FIG. 9(B), if the elongated optical cell 2 is standing up with respect to the connection direction X with the gas cell 1, the surface plate 10 is not necessarily required to face the gas cell 1, for example, by being arranged on the opposite side of the gas cell 1.

The gas cell 1 may have various shapes such as a substantially rectangular parallelepiped shape, a substantially cubic shape, and a substantially cylindrical shape, and the flow direction of the gas and the size (length) along the direction orthogonal thereto may be appropriately changed.

Furthermore, the gas analyzing device 100 according to the present invention may be, for example, an analyzing device using Fourier transform infrared spectroscopy (FTIR), non-dispersive infrared absorption (NDIR), or the like.

In addition, various modifications and combinations of the embodiment may be made without departing from the gist of the present invention.

INDUSTRIAL APPLICABILITY

According to the present invention, it is possible to reduce the moment in the gravity direction generated about the fulcrum of an attachment location or the like and to suppress optical axis deviation as much as possible.

The invention claimed is:

1. A gas analyzing device that irradiates a gas with a laser beam and detects the laser beam having penetrated the gas to analyze a component to be measured contained in the gas, the gas analyzing device comprising:
- a gas cell attached to a piping through which the gas flows and into which the gas is introduced;
- an elongated optical cell connected to the gas cell from a predetermined connection direction, the elongated optical cell accommodating a first mirror supported by an elongated surface plate in a first state of being disposed on a first optical path of the laser beam, wherein the elongated surface plate is disposed to face the gas cell, and wherein the elongated surface plate is orthogonal to the connection direction;
- a heating mechanism that heats the gas cell;
- a heat insulating material that covers the gas cell; and
- a beam member with one end portion thereof connected to the elongated optical cell and another end portion thereof positioned inside the heat insulating material and connected to the gas cell, the beam member connecting the elongated optical cell and the gas cell.

2. The gas analyzing device according to claim 1, wherein the elongated surface plate is disposed closer to the gas cell than a central portion of the elongated optical cell.

3. A gas analyzing device that irradiates a gas with a laser beam and detects the laser beam having penetrated the gas to analyze a component to be measured contained in the gas, the gas analyzing device comprising:
- a gas cell attached to a piping through which the gas flows and into which the gas is introduced;
- an optical cell connected to the gas cell from a predetermined connection direction, the optical cell accommodating a mirror supported by a surface plate in a state of being disposed on an optical path of the laser beam, wherein the surface plate is disposed to face the gas cell, and wherein the surface plate is orthogonal to the connection direction;
- a heating mechanism that heats the gas cell;
- a heat insulating material that covers the gas cell; and
- a beam member with one end portion thereof connected to the elongated optical cell and another end portion thereof positioned inside the heat insulating material and connected to the gas cell, the beam member connecting the elongated optical cell and the gas cell.

4. The gas analyzing device according to claim 1, wherein a light source that emits the laser beam, a detector that detects the laser beam, the first mirror on a light-projecting side that guides the laser beam emitted from the light source to the gas cell, and the first mirror on a light-receiving side that guides the laser beam having penetrated the gas to the detector are supported by the elongated surface plate.

5. The gas analyzing device according to claim 1, wherein the beam member has a higher heat insulating property than at least the elongated surface plate.

6. The gas analyzing device according to claim 1, further comprising at least two reflecting mirrors that reflect the laser beam as the first mirror on the light-projecting side that guides the laser beam to the gas cell.

7. The gas analyzing device according to claim 1, further comprising:
- an adjustment mechanism that adjusts a position or a posture of the first mirror; and
- an operation section for operating the adjustment mechanism which faces a side opposite to a central portion of the elongated optical cell.

8. The gas analyzing device according to claim 1, wherein the gas cell is provided with a pair of reflecting mirrors inside to multiply reflections of the laser beam.

9. The gas analyzing device according to claim 1, wherein the gas cell is provided in a chamber in which a semiconductor manufacturing process is performed or in a piping connected to the chamber.

10. The gas analyzing device according to claim 1, further comprising a second optical cell connected to the gas cell from a predetermined connection direction separately from the elongated optical cell, the second optical cell accommodating a second mirror supported on a second surface plate in a second state of being disposed on a second optical path of the laser beam, wherein the second surface plate of the second optical cell is disposed to face the gas cell.

* * * * *